R. TYHURST.
Eaves-Trough.

No. 165,388.

Patented July 6, 1875.

WITNESSES:
A. B. Robertson
John O. Kennon

INVENTOR:
Robert Tyhurst
BY
ATTORNEYS.

UNITED STATES PATENT OFFICE.

ROBERT TYHURST, OF DRESDEN, OHIO.

IMPROVEMENT IN EAVES-TROUGHS.

Specification forming part of Letters Patent No. 165,388, dated July 6, 1875; application filed June 12, 1875.

*To all whom it may concern:*

Be it known that I, ROBERT TYHURST, of Dresden, in the county of Muskingum and State of Ohio, have invented a new and Improved Burnt-Clay Eaves-Trough; and I do hereby declare that the following is a full, clear, and exact description of the same, reference being had to the accompanying drawing, forming a part of this specification, in which—

Figure 1:
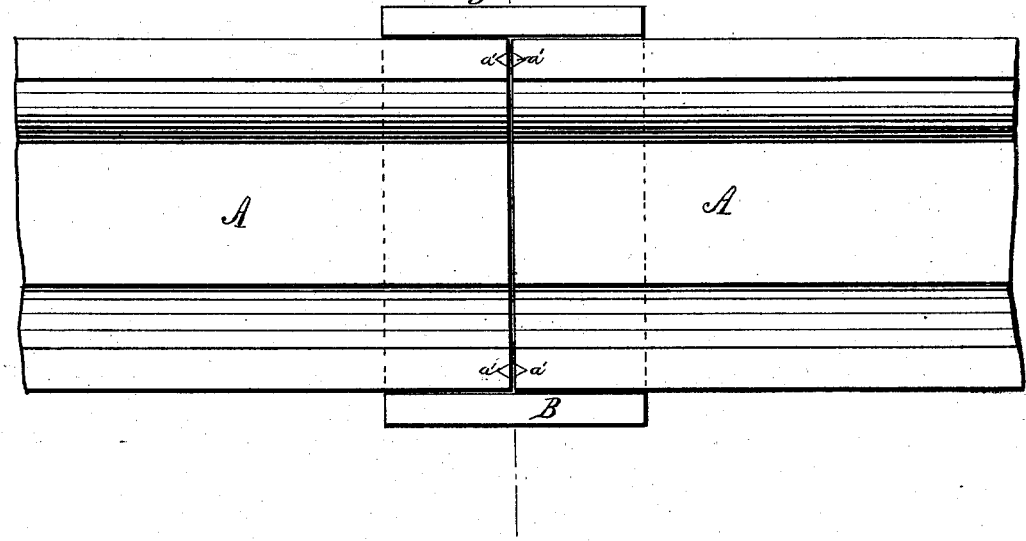
Figure 2:
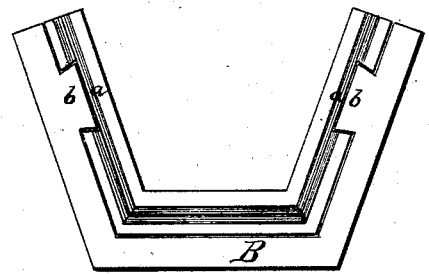

Figure 1 is a plan view, and Fig. 2 a cross sectional elevation.

The invention relates to eaves-troughs for buildings, and consists in an improvement thereof, as hereinafter first described, and then pointed out in the claim.

A A represent two sections of an eaves-trough made of burnt clay, and B the coupling by which they are united and held together. Each section of the trough is provided with dovetailed grooves $a\ a$ on the outsides, in which are received the correspondingly-shaped tongues $b$ of the coupling C. $a'$ is a groove in the ends of side and bottom of each section, so that when the section-edges contact within the coupling C, they may be connected together firmly by white lead, cement, or some other cohesive poured in said grooves, or the hole formed thereby while in a liquid state, and afterward becoming indurated. This forms a non-corrosive, weather-repellent, durable, and economical trough.

Having thus described my invention, what I claim as new is—

An earthen eaves-trough, made of sections having grooves $a\ a'$, and coupling C having tongues $b$, as shown and described.

ROBERT TYHURST.

Witnesses:
SOLON C. KEMON,
CHAS. A. PETTIT.